Aug. 31, 1926.

F. J. TINKER

LOCKING OF NUTS

Filed July 9, 1926

1,597,698

Inventor.
Frederick John Tinker
BY Reeves, Boyce & Bachelor
ATTORNEYS.

Patented Aug. 31, 1926.

1,597,698

UNITED STATES PATENT OFFICE.

FREDERICK JOHN TINKER, OF CRAYFORD, ENGLAND.

LOCKING OF NUTS.

Application filed July 9, 1926, Serial No. 121,353, and in Great Britain May 18, 1925.

The invention consists of improvements in and relating to the locking of nuts.

According to the invention a nut which is to be locked in position on a bolt or stud comprises a body or main part which is made tapered for a suitable part of its length and cylindrical for the remainder of its length and a head at the outer or rear end of said body or main part. The nut so formed is provided with two or some other suitable number of saw-cuts or slits, extending through the head and tapered part of the nut, and at its forward end with a suitable number of radially projecting tongues. This nut is adapted to be locked by means of a ring which surrounds the body or main part of the nut and is formed with a tapered bore, the taper of which is somewhat less than that of the tapered part of the nut, and with cut-away parts to receive the radially projecting tongues provided on the nut. The nut and locking ring are used in conjunction with a removable washer which may be of the form hereinafter described.

The invention is illustrated by the accompanying drawings.

Figure 1:
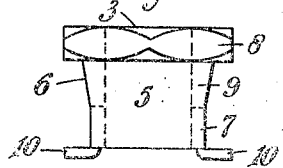
Figure 3:
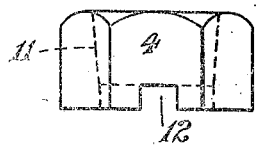
Figure 2:
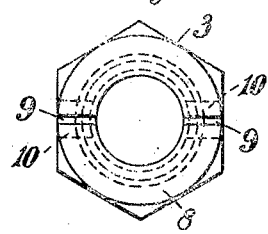
Figure 4:
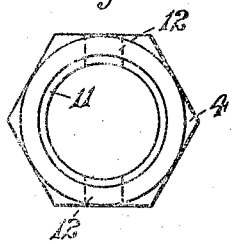
Figure 7:
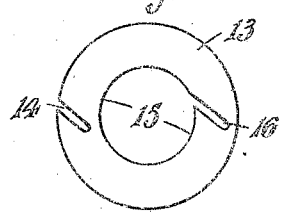
Figure 5:
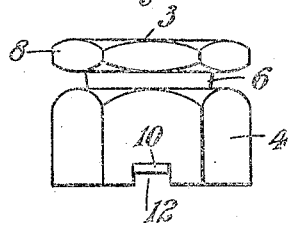
Figure 6:
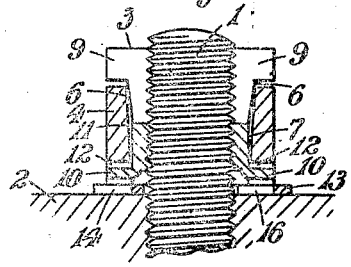

Fig. 1 is a side view and Fig. 2 is a plan of the nut shown separate from the locking rim. Figs. 3 and 4 are corresponding views of the locking ring. Fig. 5 is a side view of the nut and locking ring assembled. Fig. 6 is a section illustrating the nut locked to a stud. Fig. 7 is a plan of the washer used with the nut and locking ring.

Referring now to these drawings, 1 is a stud screwed into a piece of work 2, 3 is the nut and 4 is the locking ring of the present invention. 5 is the body or main part of the nut, and 6 and 7 are the tapered and cylindrical parts of said body or main part. 8 is the head of the nut. 9 are the saw-cuts or slits formed in the nut, and 10 are the radially projecting tongues provided on the forward end of the nut. 11 is the tapered bore of the locking ring 4, which, as will be seen from an inspection of Fig. 6, is of lesser taper than the tapered part of the exterior of the nut 3. 12 are the cut-away parts formed in the locking ring 4 for the reception of the radially projecting tongues 10 on the nut 3. The nut 3 and the locking ring 4 are formed with corresponding sides or flats.

13 is the washer used with the nut 3 and locking ring 4. As shown most clearly in Fig. 7, the washer 13 is, for the purpose of enabling it to be opened out and removed from the stud 1, formed with two oppositely disposed slits, one of which 14 extends from the periphery of the washer to a suitable distance from the bore 15 of the washer, whilst the other slit 16 extends from said bore to a suitable distance from the opposite side of the periphery of the washer.

The nut and locking ring are used and co-operate as follows:—

The washer 13 is first passed on to the stud 1, after which the nut 3, with the locking ring 4 surrounding it, is screwed on to the stud 1, by means of a spanner engaging with sides on both the head of the nut and the ring, until the forward end of the locking ring 4 bears against the washer 13, when the nut will be locked. To unlock the nut all that is necessary is to remove the washer 13 and cause the locking ring 4 to fall by a smart blow on its top. The removal of the washer 13 is effected by cutting through, by means of a suitable tool, the part of the washer obtaining between the inner end of the slit 14 and the bore 15 of the washer and opening out the latter.

Having now described my invention what I have invented and desire to secure by Letters Patent of the United States is as follows:—

The combination of a nut which is formed at its outer or rear end with a head and in front of said head with a body or main part of taper and cylindrical shapes externally and is provided with slits or saw-cuts extending through said head and the tapered part of said body or main part and with radially projecting tongues at the forward end of the cylindrical part of said body or main part, a locking ring surrounding the body or main part of said nut and formed with cut-away parts for the radially projecting tongues of said nut and with a tapered bore which is of a taper less than that of the tapered part of said nut, and a washer, to be interposed between said locking ring and the work, which is constructed in such a manner that it can, when the nut is to be unlocked, be opened out and removed, substantially as described.

In testimony whereof I have signed my name to this specification.

FREDERICK JOHN TINKER.